(12) United States Patent
Otterstrom et al.

(10) Patent No.: US 7,690,333 B2
(45) Date of Patent: *Apr. 6, 2010

(54) SYSTEM AND METHOD FOR THE CO-GENERATION OF FUEL HAVING A CLOSED-LOOP ENERGY CYCLE

(75) Inventors: Gary G. Otterstrom, Lindon, UT (US); Charles P. Lindsey, West Valley City, UT (US)

(73) Assignee: Gemini Energy Technologies, Inc., Lindon, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/145,248

(22) Filed: Jun. 24, 2008

(65) Prior Publication Data
US 2008/0257284 A1 Oct. 23, 2008

Related U.S. Application Data

(63) Continuation of application No. 11/132,843, filed on May 19, 2005, now Pat. No. 7,401,578.

(60) Provisional application No. 60/573,413, filed on May 21, 2004.

(51) Int. Cl.
*F02B 43/08* (2006.01)
*F01P 9/00* (2006.01)
*F02G 3/00* (2006.01)

(52) U.S. Cl. .................... 123/3; 123/41.01; 123/41.2; 60/616

(58) Field of Classification Search ............... 123/1 A, 123/3, DIG. 12, 41.01, 41.19–41.27, 41.51; 60/616, 618
See application file for complete search history.

(56) References Cited

U.S. PATENT DOCUMENTS

| | | | |
|---|---|---|---|
| 3,939,806 A | 2/1976 | Bradley | |
| 4,307,568 A | 12/1981 | Huller et al. | |
| 5,000,003 A * | 3/1991 | Wicks | 60/618 |
| 6,659,049 B2 | 12/2003 | Zagaja et al. | |
| 6,913,068 B2 * | 7/2005 | Togawa et al. | 60/616 |
| 6,988,492 B2 * | 1/2006 | Shetley | 123/525 |
| 2003/0085135 A1 * | 5/2003 | Andrews et al. | 205/637 |
| 2003/0159663 A1 * | 8/2003 | Zagaja et al. | 123/3 |

* cited by examiner

*Primary Examiner*—Noah Kamen
(74) *Attorney, Agent, or Firm*—Thomas M. Isaacson

(57) ABSTRACT

A system is provided that draws heat from an open-loop engine cycle into a closed-loop working fluid circulatory system that utilizes computer-aided feedback mechanisms. The closed-loop working fluid draws engine heat from multiple sources: exhaust stack gases, the engine block, the engine transmission, and the engine headers and exhaust manifold near the valves. Heat exchangers are arranged in an ascending pattern according to the temperature of the heat at each heat generating location of the open-loop engine cycle. A wankel or similar type engine receives the heated working fluid and rotates a shaft connected to a generator to generate electricity. An electrolysis unit is powered by the generated electricity and separates water into hydrogen and oxygen. A reformation unit receives fuel such as diesel and the generated hydrogen to reform the fuel prior to injection into the engine for combustion. Oxygen from hydrolysis is combined with ambient air to increase combustion efficiency and reduce harmful emissions.

18 Claims, 5 Drawing Sheets

| FIG. 2A | FIG. 2B |

SYSTEM AND METHOD FOR THE CO-GENERATION OF FUEL HAVING A CLOSED-LOOP ENERGY CYCLE

PRIORITY CLAIM

The present application is a continuation of U.S. patent application Ser. No. 11/132,843, filed May 19, 2005, which claims priority to U.S. Provisional Application No. 60/573,413, filed May 21, 2004, the contents of which are incorporated herein by reference.

BACKGROUND OF THE INVENTION

1. Field of the Invention

The present invention relates to engines and more specifically to an improved internal combustion engine having an open thermodynamic cycle where air and fuel expand to move a piston, perform work and vent exhaust to the environment and a closed loop thermodynamic cycle that converts wasted heat from the open cycle into electrical and chemical energy.

2. Introduction

In a typical diesel engine, such as one used for large vehicles such as semi-trucks, an open thermodynamic cycle receives a mixture of diesel fuel and air, compresses and combusts the mixture to drive pistons in the engine. The moving pistons produce mechanical work in the form of a turning drive shaft. The output of the thermodynamic process is mechanical work plus waste products such as heat and exhaust that are emitted into the surrounding atmosphere. Since the output is emitted into the surroundings, the cycle is referred to as an "open loop." The efficiency of such an engine is typically around 45% and much energy is lost in the form of waste products.

Attempts have been made to utilize the energy available from the heat and exhaust. For example, U.S. Pat. No. 3,939,806 to Bradley ("Bradley") discloses a closed circulatory system that generates energy from the exhaust heat of an engine. FIG. 1 generally illustrates the engine 10 and closed loop cycle 20 of Bradley. The same numbering scheme from Bradley's FIG. 1 is preserved.

In Bradley, heat from the exhaust 18 is transferred to a cool working fluid 27 which operates in a closed-loop cycle 20, which drives a turbine 24 to produce current to a generator 31. DC current is delivered to an electrolysis cell 32 that produces oxygen 34 and hydrogen 33 by decomposing water. The oxygen 53 is passed to an air intake on the engine 10 and the hydrogen may also be passed 51 to the engine. The working fluid 21 is condensed in condenser 26 to complete the closed loop 20.

In general, Bradley's device 100 has a number of deficiencies. For example, a turbine 24 will typically operate in a very narrow range of performance. Vehicles travel down the road at many variant revolutions per minute, under different loads and at many different speeds. With these variables, the engine cannot produce the narrow range of outputs needed by a typical turbine. Such a turbine does not function efficiently because it is unable to adjust to these described variations based on the loads and other factors. Because of these limitations on the operation of turbines, a deficiency in this system and on its performance exists.

Bradley also notes that their system is in communication with the cooling system of the engine block 10. However, Bradley ignores other heat generated by the engine 10. Because the Bradley concept fails to take into account other sources of heat beyond the existing cooling system 22, it is therefore further flawed. Outputs of hydrogen and oxygen are limited by the amount of electricity the system can generate because other heat sources are ignored. In relative terms, the Bradley device delivers very small quantities of hydrogen and oxygen from electrolysis to the engine intake and combines them with ambient air without reforming the fuel prior to ignition. Optimal increase in combustion and decrease in emissions is not achieved.

Another deficiency in the Bradley system is the lack of sufficient radiator surfaces to cool the closed loop system. The working fluid in a closed system needs to be cooled properly. Bradley does show a condenser 26 to convert the gaseous form of the working fluid into a liquid again, but there is not a sufficient disclosure with regards to mechanisms for being able to recycle the working fluid in the second closed loop system.

Government established exhaust emission standards require manufacturers to design environmentally-friendly engines. Due to current deficiencies in the art, engines that meet the cleaner air standards can only be achieved at the expense of engine efficiency/fuel economy. This is a significant problem given the fact that fuel prices continue to increase, not only because known oil reserves are being depleted, but because global consumption is sharply rising. The need for more fuel-efficient vehicles continues to grow.

There are theoretical limits to the energy that may be generated from an engine and increasing the efficiency of an engine by even a few percentage points is difficult. Accordingly, what is needed in the art is an improved engine that utilizes the waste heat more efficiently to increase the amount of mechanical work derived from fuels. Further, what is needed in the art is a way to enable vehicle manufacturers to meet government emissions standards while simultaneously increasing fuel economy.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The present invention addresses the deficiencies in the prior art by providing an improved engine that has a closed-loop working fluid circulatory system that utilizes computer-aided feedback mechanisms. The system aspect of the invention utilizes engine heat from multiple sources: heat exchange from the exhaust stack gases, heat exchange from the engine block, heat exchange from the engine transmission, and high temperature heat exchange from the engine headers and exhaust manifold near the valves. These heat exchangers preferably are arranged in an ascending pattern according to the temperature of the heat at each location beginning with the lowest potential energy transfer point.

A wankel or similar type engine receives the heated working fluid and rotates a shaft connected to a generator to generate electricity. An electrolysis unit is powered by the generated electricity and separates water into hydrogen and oxygen. A reformation unit receives fuel and the generated hydrogen to reform the fuel prior to injection into the engine for combustion.

The invention includes a system embodiment and a method embodiment. Various other aspects and embodiments may also be separately claimed.

BRIEF DESCRIPTION OF THE DRAWINGS

In order to describe the manner in which the advantages and features of the invention can be derived, a more particular description of the invention briefly described above will be rendered by reference to specific embodiments of the invention and its components, which are illustrated, in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The invention relates to an improved engine that utilizes a closed-loop cycle that converts waste heat from the open-loop cycle into electrical and chemical energy. The energy obtained from the excess heat, through a co-generation hybrid system, is converted into electricity, oxygen and hydrogen. The co-generation hybrid system may fit onto a standard engine block and be purchased in the form of a kit or may be part of a newly manufactured integrated system from the factory. One advantage of the invention disclosed herein is that oxygen, hydrogen and electrical energy can be obtained from the excess heat generated from a working engine that can then be used to both improve the efficiency of the engine and reduce exhaust emissions at the same time. On-board reformation of fuels, the addition of hydrogen to diesel (or other fuel) at the molecular level, and the addition of oxygen to the engine intake adds potential chemical energy to the fuel, improves combustion and reduces emissions. Furthermore, a drive-assist electronic motor can further be incorporated with the drive shaft to increase fuel efficiency.

Figures 1, 2:
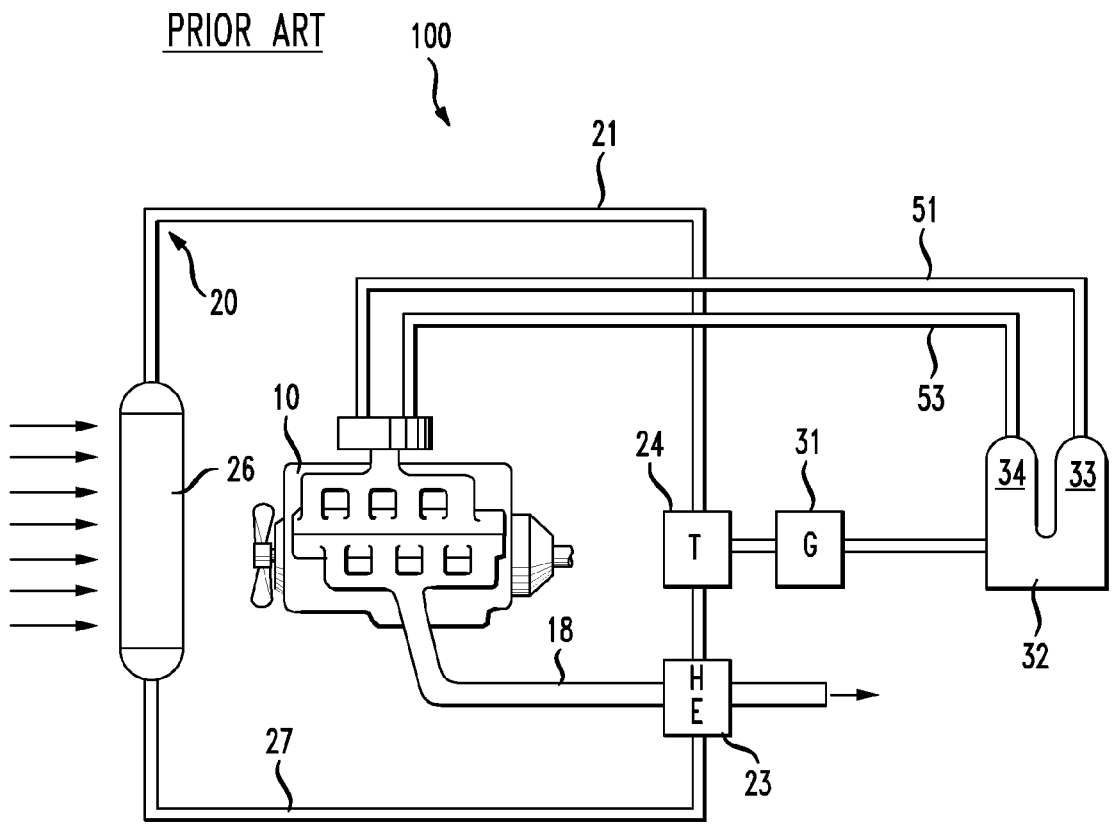
FIG. 1 illustrates a prior art closed loop system associated with an engine.
FIG. 2 illustrates the relationship of FIG. 2A to FIG. 2B.
Figure 2A:
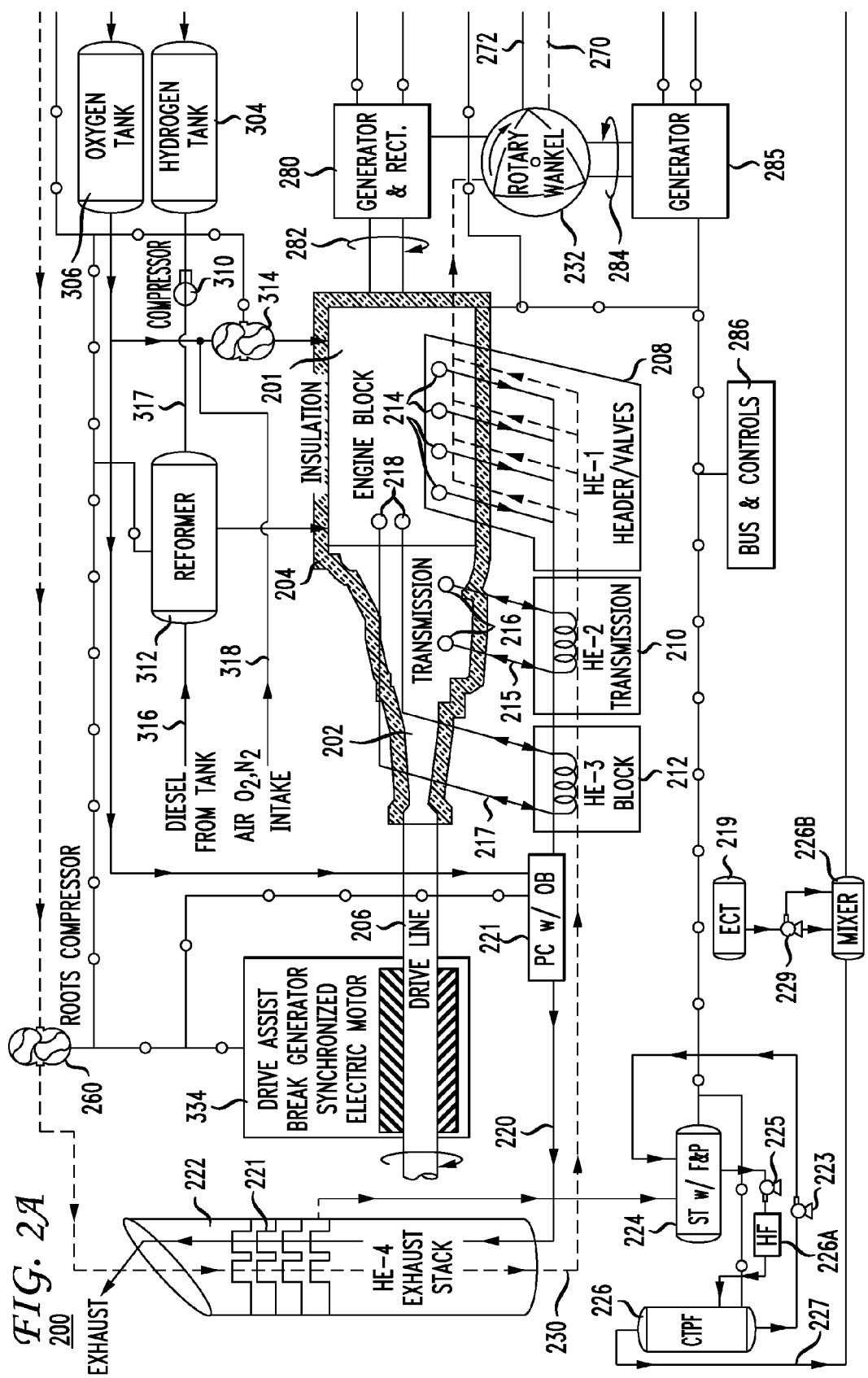
FIG. 2A illustrates an aspect of the present invention.
Figure 2B:
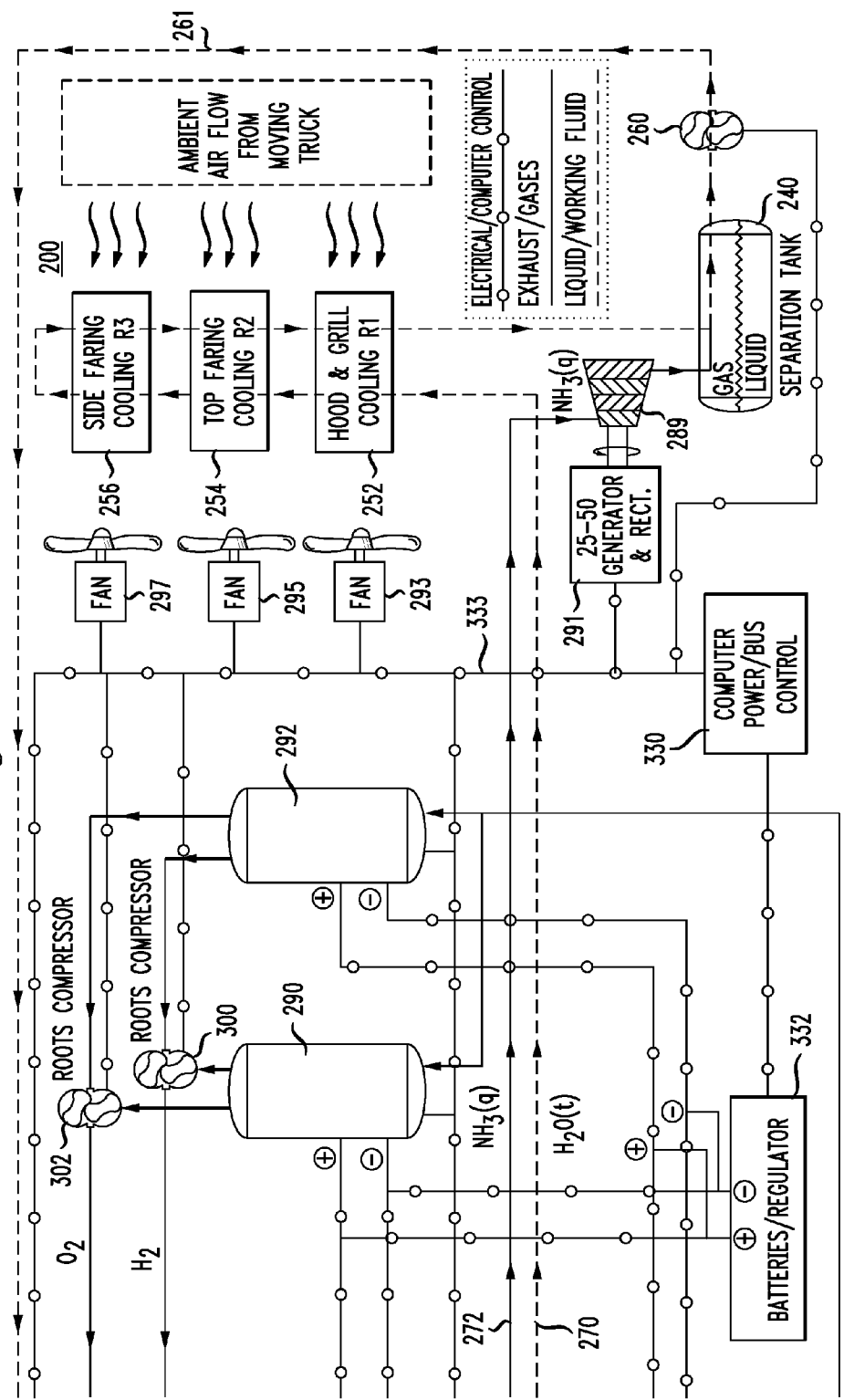
FIG. 2B illustrates another aspect of the present invention.

The various aspects of the invention will be described with reference to FIGS. 2A and 2B. The engine 200 is generally shown with an engine block 201 and associated open-loop and closed loop energy cycles. The intermittent line 230 in FIGS. 2A and 2B represents the working fluid of the closed loop energy cycle. The working fluid preferably runs in the direction of the arrows shown, so that it can pick up heat as it passes through the heat exchangers, in order of their energy potential. The solid line 220 represents the working fluid of the primary thermodynamic open loop cycle (which is gas) that vents directly to the environment or the atmosphere as is known in the art. These lines are shown as running counter-current to each, because running the open loop working fluid 220 counter to the closed loop working fluid 230 provides optimal heat exchange.

The engine 200 is preferably a piston-based engine that can utilize a number of fuels such as diesel, bio-diesel, clean-diesel, any grade of degradable bio-diesel or some kind of straight oil such as canola oil, rapeseed oil or a petroleum based oil having a heavier molecular weight because of hydrogen production and the reformation process. The vehicle may have several fuel tanks, each receiving a different type of fuel. The flexibility in the type of fuel being consumed by the engine 200 enables a vehicle having this engine 200 to fill up at various locations and not be limited to diesel.

The present invention involves using hydrogen on board a vehicle to reform its fuel while the vehicle is in operation. In addition to being a high-energy fuel in its own right, hydrogen is currently being used to break down hydrocarbon chains at refineries in the transformation of crude oil into distillates. The fuel 316 is input to a reformer 312 under high pressure and heat. The reformer is a pressurized and heated vessel that is filled with catalytic material, such as iron filings, gold, palladium or platinum. Other catalytic materials known to those of skill in the art may also be used. The reformation unit 312 joins hydrogen from the hydrogen tank 304 with the fuel. A compressor 310 receives the hydrogen from the hydrogen tank 304 and communicates compressed hydrogen to the reformation chamber 312. Compressor 310 is preferably a small electric pump and pressurizes the hydrogen to an extremely high pressure for the breaking down or reformation of the fuel 316 for more complete combustion by the engine. A fuel injection system injects the hydrogenated or enriched fuel 317 into the combustion chamber. Because of the intimate contact between hydrogen gas and the fuel 316 prior to the formation of droplets by the injector system, free radical cracking and pre-reforming of the complex fuel molecules takes place, both prior to and during the initial stages of combustion. Turbulence within the engine cylinder during the intake and injection portion of the piston's cycle also facilitates increased molecular cracking. This has the effect of more complete combustion leaving fewer hydrocarbon fragments to pollute the exhaust stream and become trapped as carbon deposits on the engine and in the engine oil.

The present invention utilizes as much heat as possible from the combustion engine. To prevent heat from radiating to the atmosphere, a blanket of insulation 204 covers engine block 201 and transmission 202. Normally, the engine block radiates the heat into the atmosphere but according to the invention, the blanket 204 covering the engine block redirects the heat from the engine to energize the closed loop system. The blanket 204 can be made in various different ways. It may be a multi-layer blanket or a shell blanket with different kinds of insulation built in a way that forms an isothermal barrier to keep the heat in the engine compartment so that it can be directed to various heat exchangers in the engine.

Heat Exchange Systems

As introduced above, it is an aspect of the invention to utilize heat generated from the engine for producing electricity. Multiple heat exchangers efficiently draw heat into the closed-loop working fluid. FIGS. 2A and 2B illustrate four heat exchangers 208, 210, 212, 222. One or more of the heat exchangers in the closed loop cycle may have small motors and pumps associated with them. Any motor and pump associated with a heat exchanger optimizes heat transfer within the exchanger by controlling the amount of time the working fluid of the closed loop system is in contact with the heat source. These motors and pumps are controlled to a certain temperature by the system computer 330 so that maximum heat is transferred to the closed loop working fluid before the fluid continues along the closed loop cycle. Each heat exchanger may have a small reservoir of working fluid. The working fluid 230 may be any one of a number of possible choices, for example: water and ammonia in various combinations, iso-butanes and so forth. Those of skill in the art will recognize and be able to identify other types of working fluids that may be used as well. The present invention does not require any specific working fluid. Working fluid reservoir (not shown) capacity will be large enough to facilitate optimum heat exchange and work output.

Exhaust Stack

The working fluid 230 gathers heat from the various sources of heat within the engine system in a particular order, preferably from lowest heat potential to highest. However, any particular order is contemplated as part of the invention. The first heat exchanger 222 is the exhaust stack heat exchanger. Heat exchanger 222 has the lowest energy potential because it exchanges heat with relatively cool and slow moving combustion gases 220 exiting the open loop cycle into the atmosphere through the stack. Exhaust gases pass through the first heat exchanger 222 and cool to the dew point temperature of water causing the water to condense out of the exhaust 220. This condensate water is caught in bubble cap chevrons 221 or other similar device. Water captured in the chevrons transfers heat to the working fluid 230.

The stack heat exchanger 222 also has an additional function. As water condenses from the exhaust gas it scrubs microparticulates and unburned hydrocarbon fragments out of the exhaust stream. As excess water fills the bubble-caps, it is siphoned off into water surge tank 224. Those of skill in the art will recognize other possible mechanisms for filtering the exhaust gasses for particulates. Other ways are contemplated, whether they utilize water or not as the filtering mechanism, as within the scope of the invention. The chevron method is preferable.

The water condensed out of the exhaust stream 220 is used in the electrolysis process described below. The water is processed to prepare it for optimal use in this process. This surge tank 224 preferably has several devices associated with it for such preparation. A pressurized water pump 225 pumps water from the surge tank 224 into an activated charcoal hydrocarbon filter 226. Filtered water from the hydrocarbon filter 226 is introduced into the vacuum distillation unit 231. The vacuum distillation unit 231 is preferably heated with an electric heater. The pure water distillate from the vacuum distillation unit 231 is introduced into an electrolyte mixer 227. Electrolyte pump/injector 229 receives electrolyte concentrate from the electrolyte concentrate tank 219. The electrolyte concentrate and distilled water are blended in mixer 227 and delivered to electrolysis units 290 and 292. Optionally, there may also be a condenser tank and pump between the unit 331 and the mixer 227.

Engine Block

The second heat exchanger 212 draws heat from the engine block 201 which is the third highest potential energy source. Heat exchanger 212 uses the engine cooling fluid 217 to transfer heat from combustion within the block to the working fluid 230 in the closed loop thermodynamic cycle. In heat exchanger 212, block coolant stream 217 draws heat from the engine block 201 via circulation through the engine block and transmits its heat to the working fluid via circulation around an array of heat-conducting tubes and fins filled with the closed loop working fluid 230.

Transmission

The second highest heat source is the engine transmission 202. Transmission fluid 215 draws heat from the engine transmission 202 via heat exchange points 216 and, since fluid 215 is hotter than the working fluid 230, communicates its heat to the working fluid 230 through the transmission heat exchanger 210. The heat exchanger 210 may comprise an array of heat conducting tubes and fins filled with the closed loop working fluid 230. Other structures for the heat exchangers 212 and 210 are also contemplated and may be identified by those of skill in the art for transferring heat from a hotter working fluid to a cooler working fluid.

Exhaust Manifold & Headers

The highest energy potential exchange point is the exhaust manifold and headers 214. Heat exchanger 208 draws heat from the exhaust as it passes through the exhaust manifold in close proximity to the valves in the engine head/s. Feature 214 represents these heat exchanged locations within the engine block. Drawing heat away from the engine at a period of time when the gases are at maximum density and maximum temperature insures that the heat transfer to the co-generation working fluid 230 will be as complete as possible. The group of heat exchangers 222, 212, 210, 208 may be provided in a compact configuration in that they do not necessarily have to be separate units. They may be all part of one mechanism separated by walls and formed in a compact configuration. Therefore, if necessary, these heat exchanges may be fashioned to conserve space and thus the configuration shown in FIG. 2A is only meant as an example.

Co-Generation

Super heated working fluid exiting heat exchanger 208 is flashed to a gas at a rotary wankel turbine 232 in order to perform shaft work 284 and turn generator 285 to make electricity. From the heat exchangers, the working fluid flows to a wankel 232 which is a single blade rotary turbine that has a single rotating blade with three chambers that rotate with the blade via a valve system (not shown) that is computer controlled. The wankel engine separates two-phased gas flow from the closed loop working system. Because condensation occurs with a two-phased flow, the axis of the wankel rotates in the vertical plane and the valves on the top vertical and bottom vertical of this system have the ability to separate the working fluid into a gas and a liquid. Although the system according to the invention does not necessarily have to work with two-phases, it is preferable to use a two-phased flow, where a normal turbine would not. The valve operation in the wankel engine 232 allows for gas, such as ammonia $NH_3$, to be dispensed out the top, flow upward against gravity through line 272 to the separation tank 240. A liquid, such as water, flows downward with gravity in the wankel 232 and out line 270. If a single-phase working fluid is used, the flow will not be separated.

The water 270 flows through a pump 271 through radiators 252, 254 and 256 to the separation tank 240. Optionally, the water from the wankel 232 may flow through the turbine 289 which may operate as a heat exchanger as well. This optional path for the water 270 is not shown in the figures. The separation tank 240 rejoins the two binary fluids 272, 270 coming out of the wankel engine 232. The tank 240 is typically partially filled with water and includes the ammonia (or other) gas from the wankel 232. As the water returns from the three radiators 252, 254, 256, it is sprayed to atomize the particles over the ammonia in the tank 240. The ammonia is also sprayed across the surface of the water in the tank 240 in the direction of a compressor 260. The atomized, cooled water makes intimate contact with the cool ammonia. The dropletatomized water and ammonia are sprayed in the direction of the compressor 260. The on-board computer and electrical control 330, 331 control the compressor 260. There may be a compressor (not shown) as part of the separate tank that begins the process of compression of the ammonia and water. As can be appreciated, there are a number of ways that the cooled water and ammonia may be atomized and sprayed for the purpose of recombination. Those of skill in the art will recognize and understand that various ways are contemplated for this recombination process in preparation for compression in the closed-loop cycle. Compressor 260 compresses the ammonia and water flow from the tank 240 back into a liquid 261 that is re-circulated to the first heat exchanger 222 to complete the closed loop cycle.

The vehicle uses energy to overcome resistance from oncoming wind. One aspect of the invention takes advantage of the wind related energy loss by using that same wind to cool the closed-loop working fluid. The radiators 252, 254, 256 are also designed to include a capillary action so that a two-phase flow can flow through them. These radiators cool the working fluid 270 down so that it will re-condense. The radiators 252, 254, 256 cool down the working fluid 270 using ambient air that moves across the vehicle. When the vehicle is not moving, ambient air must still pass across the radiators. Therefore, one aspect of the invention is to utilize fans 293, 295, 297 that are computer controlled 330 to move air across one or more of the radiators if necessary. Other back up fans (not shown) may also be used.

The fans 293, 295, 297 may rotate while the vehicle moves and air rushes through the hood and the grill. In this capacity, an aspect of the invention is to utilize the fans as generators or small pumps that turn with the oncoming wind to provide pumping action or electrical generation action to create movement in the fluids that are traveling through the closed loop system.

Figure 3:
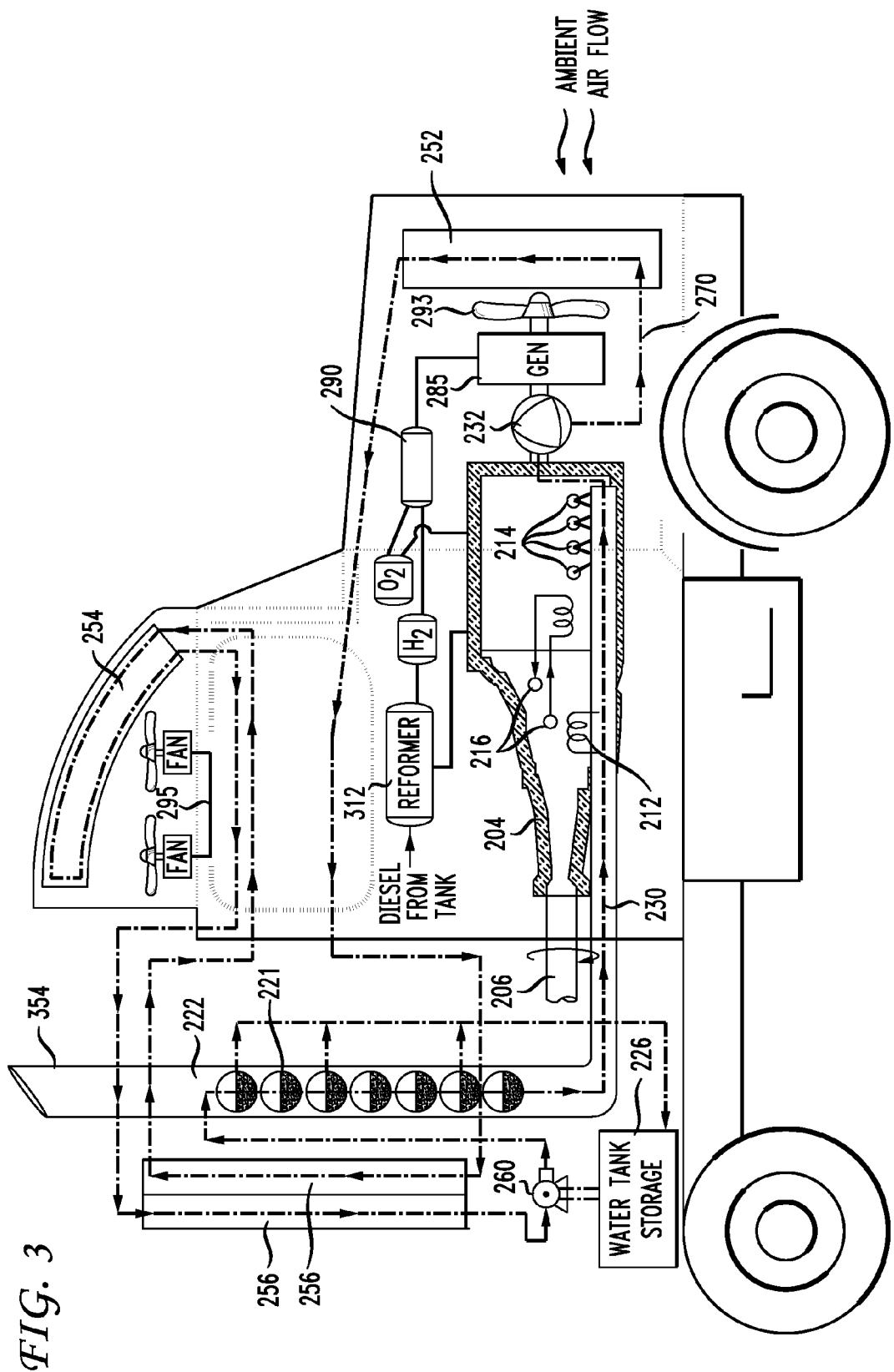
FIG. 3 illustrates the basic components of the present invention.
Figure 4:
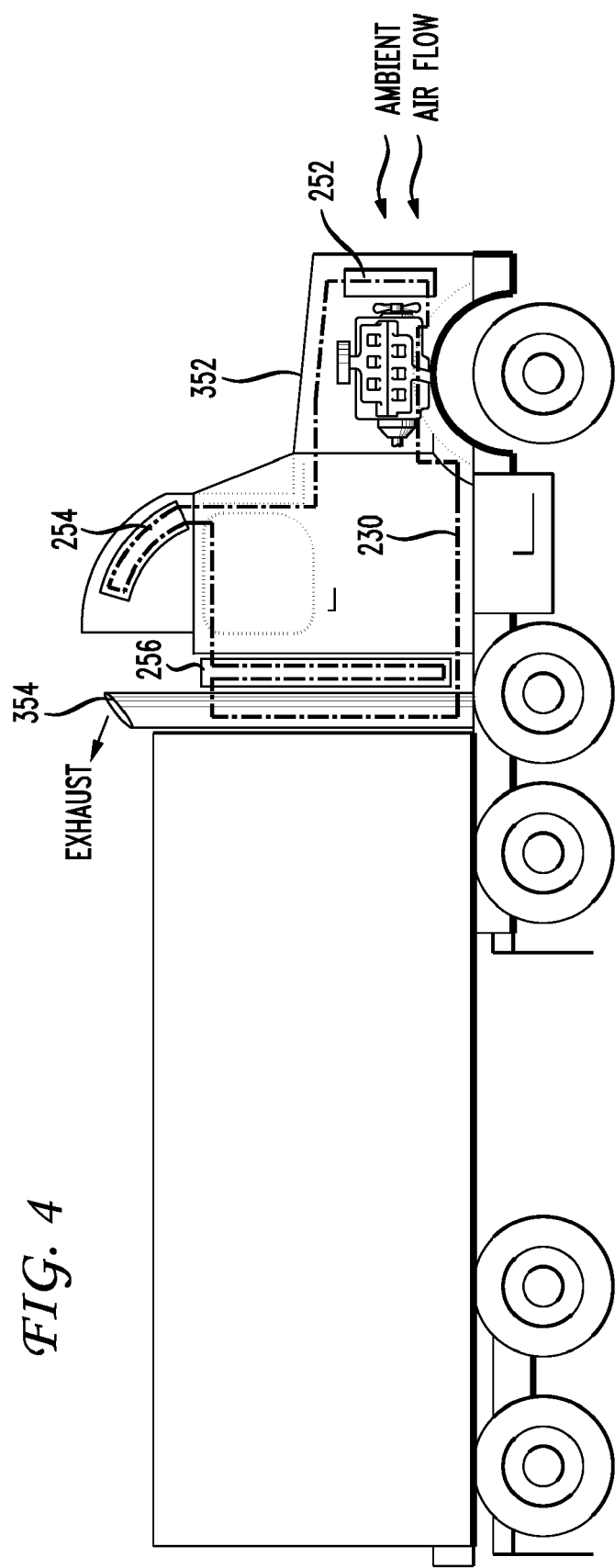
FIG. 4 illustrates the radiators in the invention in a truck embodiment.

The radiators 252, 254, 256 are positioned to take advantage of the airflow around the cab of a vehicle such as a truck. For example, in a truck embodiment, radiator 252 is the hood and grill radiator; radiator 254 is position in the top faring and radiator 256 is positioned on side farings. These configurations are illustrated in FIG. 3 and FIG. 4. Since the invention can apply to any vehicle, it is also contemplated that it may operate on a train, tractor, bus, or any other vehicle that has sufficient surface area for the radiators. The radiators may be added or moved according to need. For example, radiators may be placed on a hood, around a windshield, on a tractor trailer, or in any other location within a vehicle, trailer, etc. such that air flow around the vehicle may be utilized for cooling the working fluid.

Parasitic Loads

Inasmuch as a goal of the invention embodies improving the efficiency of an engine, one aspect of the invention involves stripping off all the parasitic loads from the engine to create an all-electric system to power all vehicle subsystems. All belts that drive the air conditioner, alternator, brake compressor, power steering and so forth on a conventional engine are stripped away. FIG. 2A shows a generator and rectifier 280 as a parasitic component attached to the main driveline via an electric clutch 281 that allow it to be coupled and decoupled from the engine as needed. This generator will only be used in the event of battery failure or diminished output from the closed loop system. The generator is computer controlled to optimize its use. With all parasitic components removed from the engine, the engine has no fan belts, no mechanical drivers that power other components, no turbo blowers, and no belt powered fans or cooling devices of any kind. This enables the conversion of more energy into driveline work.

Electricity Generation and Distribution

There are multiple electrical generators in the invention. In the preferred embodiment, five generators are used. All electricity created and used by the system is preferably direct current DC electricity. The primary source of electrical energy for the invention is the closed loop thermodynamic cycle and single blade rotary engine 232. The shaft of the wankel 232 will turn electrical generator 285 which preferably is a 40-50 HP engine. It is noted that the horsepower of the generator may depend on the application and that there is no contemplated limit. All electricity generated from the generator 285 is stored via the bus system 286 into a series of batteries 332. All electricity not stored in the batteries 332 or used to run the auxiliary systems of the vehicle will be directed to at least one of the electrolysis devices 290, 292 for the creation of hydrogen and oxygen.

If a binary working fluid 230 is used there will be unused energy in the gas that leaves the top of the wankel 232. This gas may be used to power a traditional multi blade turbine 289 that will run at high speed and lower torque to turn the shaft of an electrical generator 291. At least some of the electricity from generator 289 may be directed to one or both of the electrolysis units 290, 292 for the creation of hydrogen and oxygen. Any unused electricity will go the bus 286 of the system under the control of the computer 330 for use where needed.

The momentum of the moving vehicle may also be used to generate electricity via a fourth electrical generator 334 that will be coupled to the driveline and/or wheels of the vehicle. Activation of the electrical field in the generator will allow the generator to assist in the braking of the vehicle, while at the same time generating electricity which will be carried to the bus 286 of the invention and utilized where needed by the computer 330. Electric motor 334 can be used to power the driveline or to power assist the hydraulic drive of a hydraulic transmission. In one aspect of the invention, electric motor 334 generates electricity in a braking mode.

Computer Control

The computer 330 controls all electrical systems of the invention and communicates with elements using control lines such as link 333. The lines between the computer and any particular element are wire harnesses in general and require control lines and power lines to and from all the different sub-components, sensors and controls. A computer program manages and controls all aspects of the system 200 operation. The computer control and complex code will alleviate one of the major weaknesses in the Bradley patent sited earlier because it will ensure that all systems are optimized for the varying conditions of operation demanded by the invention. All the components of the vehicle: the air conditioning system, the lights, the controls, the computers, the pumps, the roots blower, the high-pressure compressors, etc. are part of the all-electric bus system 286. One aspect of the invention is a method, system (computing device) and computer readable medium storing instructions for controlling a computing device to provide feedback analysis and control of the various components of the system 200 disclosed herein. The various control points are shown in FIGS. 2A and 2B between the computer system 330 and each component. It is further assumed that each generator, pump, injector, filter, compressor, blower, valve actuators, etc. that may not be specifically shown as being computer controlled in the figures will have a connection to electrical power and/or the computer 330 for feedback and control as is generally known in the art.

Electrolysis

The two electrolysis units 290 and 292 preferably run off of two different electrical systems. Generator 285 preferably powers one electrolysis unit 290. Electricity from generator 285 may be directed to the electrical bus 286 of the system. Electrolysis unit 292 may be considered the backup unit. The primary electrolysis unit 290 is powered from electricity that runs from the primary co-generation cycle. The electrolysis units 290, 292 are pressurized and also have several concentric cylinders of anodes and cathodes in them to make up a great deal of surface area. Much surface area is required in the electrolysis process and since these electrolysis units 290, 292 are on-board a vehicle, the units are compact and occupy a relatively small space. The electrolysis units 290, 292 also keep the hydrogen and oxygen separate from one another. The electrolysis units 290, 292 are dual, meaning that one is a back up for the other one. Separate bus lines power them, and they can be run at different voltages and different currents.

Hydrogen and oxygen gases coming out of the electrolysis units 290, 292 are controlled by valves (not shown). The valves are computer controlled 330 and the compressors 300, 302 on each of these lines collect oxygen/hydrogen at high volume using low-pressure pumps that pump and trap the gases into separate reservoir tanks 304, 306. For safety and practicality reasons, these oxygen/hydrogen tanks are small reservoirs that hold only enough hydrogen/oxygen to provide an ongoing operation.

Reformation

Reformation is a process by which hydrogen attaches itself to hydrocarbons of aliphatic and aromatic nature, breaking them down into smaller molecules thus making them easier to combust completely in the engine. Complete combustion reduces air pollution as well as the buildup of carbon on engine parts and in the engine's oil. Compressor 310 compresses hydrogen from the hydrogen tank 304 to boost the concentration of hydrogen atoms so that the compressed hydrogen 317 can begin the process of cracking or hydrogenating the fuel in the reformer 312. The reformer 312 is a pressurized vessel filled with catalytic material, such as iron fillings, gold, palladium, or platinum. As fuel is passed through the heated reformation unit under high pressure it is joined with hydrogen from the hydrogen tank 304. The fuel 316 and high-pressure hydrogen 317 combine in the reformation chamber 312 to create an enriched hydrogenated fuel. The enriched fuel is introduced into the combustion chamber via a fuel-injection system.

Combustion of Reformed Fuel

For every two atoms of hydrogen produced in the electrolysis process one oxygen atom is formed. Delivering the oxygen to the combustion chamber so that it can recombine with its constituent hydrogen atoms is important to the enhancement of fuel economy and the reduction of pollution by the invention. Smaller hydrocarbon chains in the combustion chamber, when combined with oxygen-enriched ambient air, results in the complete combustion of fuel in the chamber. The invention preferably uses an electrically powered roots blower 314 to increase the volume of ambient air introduced into the combustion chamber. A turbo charger may also be used but they are more parasitic in nature and may reduce fuel efficiency because they restrict the flow exhaust gases as they are leaving the engine.

The roots blower 314 is a turbo compressor that is synchronized with the ramping up of the engine so that as the engine runs faster, increased volumes of ambient air are delivered to the combustion chamber. Electrolysis-created pure oxygen from the oxygen tank 306 combines with compressed air from the blower and enriches it so that complete combustion is achieved.

Hybrid Co-Generation

One aspect of the invention is that excess electricity not used to create hydrogen or to run subsystems or to be stored in batteries for use during idle or low RPM operation will be directed to a drive assist break generator/synchronized electric motor 334. The motor 334 uses excess electricity that flows from the general bus to assist the driveline 206. The computer 330 senses the torque and the RPM's on the driveline 206 and boosts that torque and the speed on the drive line 206 or maintains the speed through the synchronized electric motor 334. The motor 334 can also be used to slow down the vehicle by a braking action. In a slow down mode, the motor 334 synchronizes with the braking system of the vehicle such that when the operator steps on the brake, the first braking action of the vehicle comes through the synchronized motor 334 where the coils are slowed down through the interaction of the magnetism on the motor 334 which slows down the vehicle. This creates electricity that flows back to the storage/regulator system 332 which can then be utilized later as directed by the computer 330 in the system.

Although not shown in the drawing, the brake-synchronized motor 334 can also be applied to the wheels, driveline, or hydraulic transmission. Therefore, the brake assist generator synchronized electric motor 334 can be mounted on one or more wheels of the vehicle or it can be mounted on the drive line, or both, and can assist the vehicle in moving forward by using either stored or excess electricity. In a braking mode, the motor becomes a generator 334 using the reverse flow of electricity to recharge the batteries. This is especially useful when a vehicle moves through a city, stopping and starting at stop lights and various places, so that the energy that is created by the momentum of the truck moving forward under its weight and its speed can be recovered back into the system.

Pollution Control

The exhaust may also be processed by a particulate cyclone trap 360 that uses rotation to throw heavier particles to the outside shown in FIG. 2A. A cyclone removes particles in a gas stream by spinning the gas in a vortex at high velocity inside a cylindrical chamber. The centrifugal force acts more strongly on the larger, denser particles and flings them preferentially toward the inside wall of the cyclone where they impact and then fall to the bottom of the cyclone. The gas flows out through the top of the cyclone (still carrying some of the smaller, lighter particles), while the collected dust is removed. The particulate cyclonetrap 360 may also receive oxygen 319 from the oxygen tank 306. An oxygen burner (OB) included with the cyclonetrap 360 may burn off some of the particulates. Those of skill in the art will understand various types of cyclones that may be utilized in the exhaust system.

FIG. 3 illustrates the basic components of the invention in the context of a semi-truck. The various components are shown with a truck outline 352. One feature shown in FIG. 3 relates to the exhaust stack heat exchanger 222. The exhaust is shown as feature 354. Heat exchanger 222 associated with the exhaust 354 has a chevron system 221 that affects the dynamics of the flow such that particles and water that are condensing can be trapped in the unit. Although the primary purpose of heat exchanger 222 is to heat the working fluid in the closed loop system it can also trap pollution. Because the closed loop thermodynamic cycle has cooled the exhaust gases so much at the exhaust manifold and headers, the velocity of the exhaust gases when they reach heat exchanger 222 can be slowed down even more by the cyclone action.

The hot water recovered from the exhaust gases and stored in tank 226 is sprayed 260 onto the bubble-capped chevrons in the heat exchanger adding heat to the closed loop cycle. While airborne within the exhaust stack, the hot water also traps particulates and carries them via gravity to the bottom of the heat exchanger for filtering and disposal.

FIG. 3 also further illustrates that position of radiators 252, 254 and 256 in the context of a semi-truck. Radiator 252 is in the front of the truck. Radiator 254 is in the top faring that is used to control wind flow over the top of the cab. Radiators 256 are in the side farings of the truck that control wind flow along the side. As can be appreciated, in other vehicles such as busses, trains, tractors or any other type of vehicle to which this invention is applied, the radiator or radiators may be positioned in various places to cool down the working fluid. FIG. 3 also illustrates generally that fans 295 may be used to provide airflow across radiator 254. FIG. 4 further illustrates the truck embodiment 352 of the invention having radiators 252, 254 and 256 in the preferred positions and the exhaust 354.

Another embodiment of the invention includes a method of using co-generation to reform fuel with hydrogen for combustion. The principles set forth above are utilized in a method aspect of the invention. The method comprises, in an engine having an open-loop energy cycle, transferring heat from a plurality of heat generating locations in the open-loop energy cycle to a closed-loop working fluid, generating electrical energy from the heated closed-loop working fluid; generating hydrogen via electrolysis powered by the electrical energy; reforming fuel using the generated hydrogen, and injecting the reformed fuel into the engine. The step of transferring heat from a plurality of heat generating locations in the open-loop energy cycle to a closed-loop working fluid may further comprise transferring heat from the plurality of heat generating locations in an order of ascending available heat from each respective heat generation location. In other words, as discussed above, the order in which the working fluid receives exchanged heat begins with the coolest heat generating location, such as the exhaust stack and continues in an ascending order to the heat exchanger for the engine headers which generate the most heat.

SUMMARY

Although the above description may contain specific details, they should not be construed as limiting the claims of the invention in any way. Other configurations of the described embodiments of the invention are part of the scope of this invention. For example, the basic principles of the invention may be utilized in any vehicle, train, boat, or any device that utilizes an engine. Furthermore, even devices that do not move such as generators may utilize one or more of the principles set forth above. Benefits of the invention include a reduced thermal and radar signature of a vehicle operating with the invention and increased electrical power for auxiliary electronics. Accordingly, the appended claims and their legal equivalents should only define the invention, rather than any specific examples given.

We claim:

1. A method for co-generation of fuel in an engine having an open-loop energy cycle, the method comprising:

transferring heat from a plurality of heat generating locations in the open-loop energy cycle to a closed-loop working fluid, wherein the closed-loop working fluid first receives heat from an exhaust heat exchanger followed by receiving heat from an engine heat exchanger; and generating electrical energy from the heated closed-loop working fluid.

2. The method of claim 1, wherein the step of transferring heat from a plurality of heat generating locations in the open-loop energy cycle to a closed-loop working fluid further comprises transferring heat from the plurality of heat generating locations in an order of ascending available heat from each respective heat generation location.

3. The method of claim 1, wherein the closed-loop working fluid passes through a plurality of cooling radiators.

4. The method of claim 3, wherein the plurality of cooling radiators comprises a first cooling radiator positioned in the front of the vehicle, a second cooling radiator positioned in a roof of the vehicle and a third cooling radiator positioned on at least one side of the vehicle.

5. A system for use in connection with an engine operating in an open-loop energy cycle, the system comprising:

a closed-loop cycle having a closed-loop working fluid, the close-loop working fluid being heated by a plurality of heat generating locations in the open-loop energy cycle, the closed loop working fluid receiving heat first from an exhaust heat exchanger and afterwards receiving heat from an engine heat exchanger;

an engine blanket that channels heat from the engine heat exchanger; and a generator that receives energy from the heated closed-loop working fluid.

6. The system of claim 5, wherein the closed-loop working fluid is heated by the plurality of heat generating locations in the open-loop energy cycle in an order from a coolest heat generation location to a hottest heat generation location.

7. The system of claim 6, wherein the engine heat exchanger is one of a heat exchanger associated with an engine block, a transmission of the engine and an engine header, and wherein the order of heat generating locations is first the exhaust heat exchanger, second the heat exchanger associated with the engine block, third the heat exchanger associated with the transmission of the engine and fourth the heat exchanger associated with the engine header.

8. The system of claim 5, wherein the generator receives energy from the heated closed-loop working fluid by the heated closed-loop working fluid being processed by a rotary wankel engine.

9. The system of claim 5, wherein the generator, electrolysis unit and reformation unit are computer controlled.

10. The system of claim 5, wherein in the engine has one or zero parasitic loads.

11. The system of claim 5, wherein the closed-loop working fluid passes through a plurality of cooling radiators.

12. The system of claim 11, wherein the closed-loop working fluid passes through three radiators.

13. The system of claim 11, wherein one of the plurality of cooling radiators is positioned in front of a vehicle having the system and at least one of the other cooling radiators is positioned on a top surface of the vehicle.

14. The system of claim 11, wherein the plurality of cooling radiators comprises a first cooling radiator positioned in the front of the vehicle, a second cooling radiator positioned in a roof of the vehicle and a third cooling radiator positioned on at least one side of the vehicle.

15. The system of claim 11, further comprising at least one fan that causes air to flow over at least one radiator when outside air is not flowing through the at least one radiator.

16. The system of claim 5, further comprising a battery system for storing energy from the generator.

17. The system of claim 5, further comprising:
   means for condensing water from engine exhaust for use in the electrolysis unit.

18. The system of claim 17, wherein the means for condensing water further comprises:
   a cyclone system that separates water from impurities in the exhaust;
   a condensate tank that receives the water;
   a filter that filters the water; and
   means to provide electrolytes to the water in preparation for use of the water by the electrolysis unit.

* * * * *